US011907893B2

(12) United States Patent
Yadav et al.

(10) Patent No.: US 11,907,893 B2
(45) Date of Patent: Feb. 20, 2024

(54) ORDER FULFILLMENT WITH COMMUNITY-BASED DELIVERY

(71) Applicant: Walmart Apollo, LLC, Bentonville, AR (US)

(72) Inventors: Anuranjan Yadav, Bangalore (IN); Himanshu Jha, Bangalore (IN); Rahul Kumar, Bangalore (IN); Vivek K. Gopalani, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 341 days.

(21) Appl. No.: 17/182,065

(22) Filed: Feb. 22, 2021

(65) Prior Publication Data

US 2021/0264358 A1    Aug. 26, 2021

Related U.S. Application Data

(60) Provisional application No. 62/979,856, filed on Feb. 21, 2020.

(51) Int. Cl.
| | | |
|---|---|---|
| *G06Q 10/00* | (2023.01) | |
| *G06Q 10/0836* | (2023.01) | |
| *G06Q 10/087* | (2023.01) | |
| *G06Q 50/00* | (2012.01) | |
| *H04W 4/029* | (2018.01) | |
| *H04W 4/38* | (2018.01) | |
| *H04L 67/306* | (2022.01) | |
| *G06F 3/0482* | (2013.01) | |
| *G06Q 30/0208* | (2023.01) | |

(52) U.S. Cl.
CPC ....... *G06Q 10/0836* (2013.01); *G06Q 10/087* (2013.01); *G06Q 50/01* (2013.01); *H04L 67/306* (2013.01); *H04W 4/029* (2018.02); *H04W 4/38* (2018.02); *G06F 3/0482* (2013.01); *G06Q 30/0208* (2013.01)

(58) Field of Classification Search
CPC .. G06Q 10/0836; G06Q 10/087; G06Q 50/01; H04L 67/306
See application file for complete search history.

(56) References Cited

U.S. PATENT DOCUMENTS

| | | |
|---|---|---|
| 8,326,827 B2 | 12/2012 | Baltus |
| 8,554,694 B1 | 10/2013 | Ward |
| 2009/0048890 A1* | 2/2009 | Burgh ............ G06Q 10/06375 705/7.26 |
| 2011/0313840 A1 | 12/2011 | Mason |

(Continued)

*Primary Examiner* — Rokib Masud
(74) *Attorney, Agent, or Firm* — Foley IP Law, PLLC (57) ABSTRACT

Systems, apparatuses, and methods for order fulfillment by community delivery. A method for product delivery comprises detecting a presence of a user device of a store customer associated with a customer profile at a location associated with a store location based on a location sensor, identifying a delivery community associated with the customer profile from a plurality of delivery communities in the community database, identifying available community delivery orders associated with other members of the delivery community in an order database, instructing a pickup order fulfillment system to prepare the one or more community delivery orders for pickup by the store customer, and providing delivery instructions for the one or more community delivery orders.

20 Claims, 3 Drawing Sheets

(56) References Cited

U.S. PATENT DOCUMENTS

2014/0025524 A1   1/2014  Sims
2014/0279667 A1*  9/2014  Gillen ................ G06Q 10/0836
                                                     705/339
2015/0161563 A1   6/2015  Mehrabi
2018/0181904 A1   6/2018  Wilkinson

* cited by examiner

ORDER FULFILLMENT WITH COMMUNITY-BASED DELIVERY

CROSS-REFERENCE TO RELATED APPLICATION(S)

This application is related to U.S. Provisional Application No. 62/979,856 filed Feb. 21, 2020, which is incorporated herein by reference in its entirety.

TECHNICAL FIELD

These teachings relate generally to shopping environments and more particularly to devices, systems, and methods for fulfilling pickup orders.

BACKGROUND

Conventionally, when a customer places an order online, products are delivered to the customer via a courier company such as the postal service. Some stores also offer customers the option to place store pickup orders online. With a store pickup order, items ordered by a customer are gathered and stored at a designated area (e.g. customer service area, storage area) and the customer can retrieve the items they ordered at one location in the store when they arrive.

BRIEF DESCRIPTION OF THE DRAWINGS

The above needs are at least partially met through provision of embodiments of systems, devices, and methods for order fulfillment with community-based delivery, such as described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "an embodiment," and similar language throughout this specification may, but do not necessarily, all refer to the same embodiment.

Figure 1:
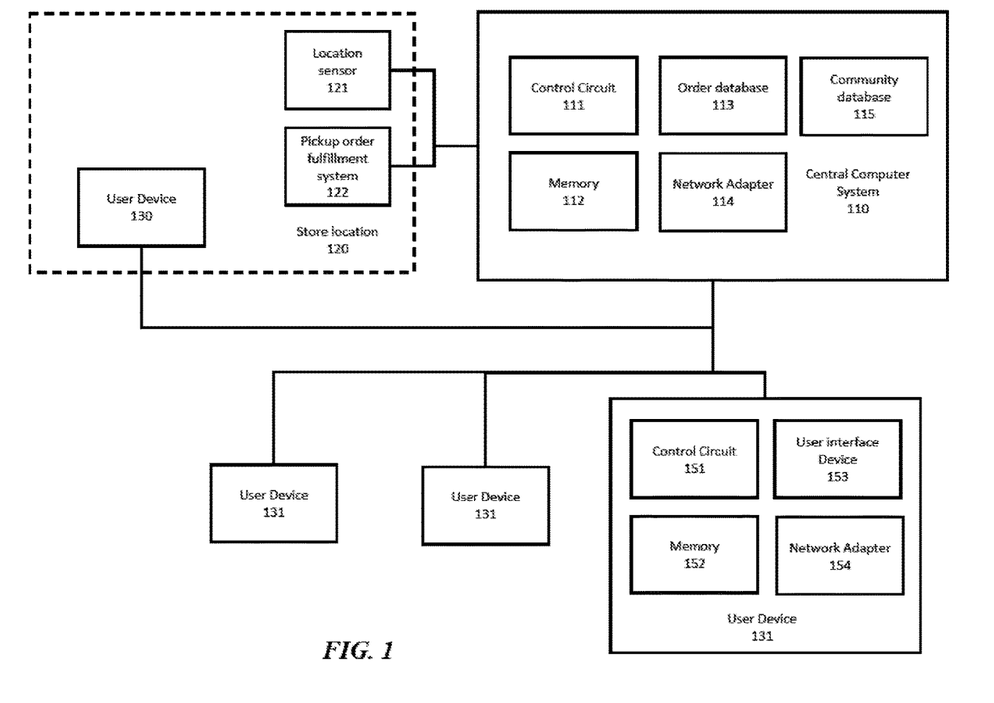
FIG. 1 comprises a block diagram of a system in accordance with some embodiments.

FIG. 1 illustrates a block diagram of a system for order fulfillment in accordance with various embodiments of these teachings. The system includes a central computer system 110 in communication with user devices 131 and a location sensor 121, a pickup order fulfillment system 122, and a user device 130 at a store location 120.

The central computer system 110 includes a control circuit 111, a memory 112, an order database 113, a community database 115, and a network adapter 114. The central computer system 110 may comprise a processor-based device, a computing device, a server, a backend system, and the like. In some embodiments, the central computer system 110 may be implemented with one or more physical processor-based devices. In some embodiments, the central computer system 110 may be located at the store location 120 or may be remotely located.

The central computer system 110 has stored on its memory 112 a set of computer-readable instructions that is executable by the control circuit 111 to cause the control circuit 111 to facilitate the fulfillment of pickup orders based on communications with the user device 130 and information stored in the order database 113 and community database 115. In some embodiments, the central computer system 110 may select available community pickup orders for an in-store customer based on their delivery community affiliations, and instruct the pickup order fulfillment system 122 to allow the in-store customer to pick up and deliver orders to one or more other members in their delivery community. In some embodiments, the central computer system 110 may provide a community delivery graphic user interface to the user devices 130 and 131 to allow customers to configure their pickup orders, view and select available community delivery orders, and configure options and preferences associated with a community delivery program. In some embodiments, the central computer system 110 is further configured to communicate with user devices 130 and 131 to recommend, form, and/or modify delivery communities. A delivery community generally refers to a group of customers that have elected to join a group in the community delivery program to share in the pickup and delivery of orders for each other. In some embodiments, the control circuit 111 is configured to perform one or more steps described with reference to FIG. 2 herein.

The network adapter 114 generally comprises circuitry configured to connect the control circuit 111 to a network and exchange messages with user devices 130 and 131, the location sensor 121, and the pickup order fulfillment system 122. In some embodiments, the network adapter 114 may comprise one or more of a wired or wireless network adapter, a network port, a network modem, a router, a network security device, and the like.

The order database 113 comprises a computer-readable memory storing information associated with customer orders. In some embodiments, the orders in the order database 113 comprise in-store pickup orders in which customers select items to purchase via a user interface (e.g. a webpage, mobile application) and elect to pick up selected items in person at a store location at a later time. In some embodiments, records of orders in the order database 113 may comprise one or more of customer identifier, item identifiers, item quantities, pickup location, pick up time, and authorized pick up person. In some embodiments, the order database 113 may further store the status of the orders, such as placed, assigned for picking, being picked, ready for customer pick up, picked up by a customer, and canceled. In some embodiments, the order database 113 may further store authorized pickup person(s) for each person. The information in the order database 113 may be used by the central computer system 110 to select available pickup orders to suggest to a customer as available orders for community delivery.

The community database 115 comprises a computer-readable memory storing information associated with customer delivery communities. A delivery community generally comprises a plurality of customers that have elected to join the community to share in the pickup and delivery of pickup orders. In some embodiments, the community database 115 stores a plurality of user profiles and at least one delivery community associated with each of the plurality of user profiles. In some embodiments, the central computer system 110 provides a community delivery user interface that provides suggestions for potential delivery communities to join. In some embodiments, the potential delivery communities are determined based on one or more of user home address, user work address, user demographic information, user-inputted data, and user's current delivery community. In some embodiments, each record of a delivery communication may comprise one or more of community members, community member roles (e.g. coordinator, moderator, regular member), associated geographic region, associated store location, preselected delivery locations, privacy setting, requirements to join, and the like. In some embodiments, a delivery community may comprise at least one coordinator authorized to add and remove members to the delivery community and/or configure attributes associates with the delivery community. In some embodiments, a delivery community may comprise a private community in which new members are required to be approved by an existing member or moderator of the community prior to joining. A delivery community may be associated with a family, a friend group, a neighborhood, an apartment or condominium building, a homeowner's association (HOA), a workplace, an office building/park, a school, a social organization (e.g. book club), a religious organization, or any user-defined group. In some embodiments, a customer may modify their delivery community associations via the delivery community user interface and update the community database 115. The information in the community database 115 may be used by the central computer system 110 to select available pickup orders to suggest to a customer as available orders for community delivery.

In some embodiments, the central computer system 110 may further comprise a user database comprising a computer-readable memory storing user profiles associated with customers. In some embodiments, user profiles may store information associated with a customer such as associated delivery community, home address, work address, contact information, demographic, default store location, preferred delivery location, payment information, purchase history, completed deliveries, community delivery incentive credit, community delivery status (e.g. gold member, platinum member, etc.). Information in the user database may be used to recommend delivery communities to customers and/or be displayed to the customer performing delivery or recipient of a pickup order that is being delivered via community delivery. In some embodiments, two or more of the order database 113, the community database 115, and the user database may be implemented as a single database. In some embodiments, the order database 113, the community database 115, and the user database may be internal, external, local, or remote from the control circuit 111 of the central computer system 110.

A user device 131 generally refers to an electronic device configured to allow a user to interact with the delivery community user interface provided by the central computer system 110. The user device 131 may comprise a mobile device, a smartphone, a tablet computer, a personal computer (PC), an internet of things (IoT) device, and the like. The user device 131 includes a control circuit 151, a memory 152, a user interface device 153, and a network adapter 154.

The user device 131 has stored on its memory 112 a set of computer-readable instructions that is executable by the control circuit 151 to cause the control circuit 151 to provide a graphical user interface based on communications with the central computer system 110. In some embodiments, the user device 131 is configured to allow the user to join and modify their membership in delivery communities. In some embodiments, the user device 131 is further configured to allow users to place pick up orders and/or select orders placed by other members to perform community delivery. In some embodiments, the control circuit 151 is configured to perform one or more steps described with reference to FIG. 2 herein.

The network adapter 154 is configured to connect the user device 131 with the central computer system 110 over a network. The network adapter 154 may comprise one or more of a network adapter, a network port, a cellular network (3G, 4G, 4G-LTE, 5G) interface, a Wi-Fi transceiver, a Bluetooth transceiver, a mobile data transceiver, and the like. The user interface device 153 of the user device 131 comprises one or more user input/output devices. In some embodiments, the user interface device 153 comprises one or more of a display screen, a touch screen, a microphone, a speaker, one or more buttons, a keyboard, a mouse, an augmented reality display, a holographic display, and the like. The user interface device 153 is generally configured to allow a user to interact with the information provided on the user device, such as a community delivery user interface provided based on communications with the central computer system 110.

The user device 130 represents a user device that is at a store location 120. The user device 130 may comprise the same or similar components as user device 130. In some embodiments, the user device 130 may comprise an in-store kiosk at which a user may provide user credentials to view available orders for community delivery.

The location sensor 121 generally comprises a sensor configured to determine whether the user device 131 is at or near a store location. In some embodiments, the location sensor 121 may comprise one or more of a network adapter, a network port, a cellular network (3G, 4G, 4G-LTE, 5G) interface, a Wi-Fi transceiver, a Bluetooth transceiver, a mobile data transceiver, and the like. In some embodiments, the location sensor 121 may comprise a network adapter configured to receive the Global Positioning System (GPS) location of the user device 130 detected by the user device 130. In some embodiments, the location sensor 121 may be part of the central computer system 110 that is remote to the store location. In some embodiments, the location sensor 121 may comprise the GPS sensor of the user device 130. In some embodiments, the location of the user device 130 may be first determined by the GPS sensor of the user device 130 and confirmed by a location sensor 121 located at the store location configured to detect a transmission (e.g. Wi-Fi signal, Bluetooth signal) from the network adapter 154 of the user device 131.

The pickup order fulfillment system 122 generally refers to one or more electronic devices configured to cause pickup orders to be prepared for customer pickup. In some embodiments, the pickup order fulfillment system 122 may comprise one or more of automated merchandise sorter, conveyer system, automated picker robots, sales or customer service terminals, store associate mobile devices, printer, store computer system, and the like. In some embodiments, the pickup order fulfillment system 122 may comprise a control circuit, a memory, and a user interface device configured to display pick instructions, display packaging instructions, print order labels, process pickup requests, and/or complete pickup orders.

While one store location 120 is shown in FIG. 1, In some embodiments, the central computer system 110 may support a plurality of store locations and provide instructions to a plurality of in-store pickup order fulfillment system 122. In some embodiments, the central computer system 110 may communicate with any number of user devices to facilitate community delivery of pickup orders.

Figure 2:
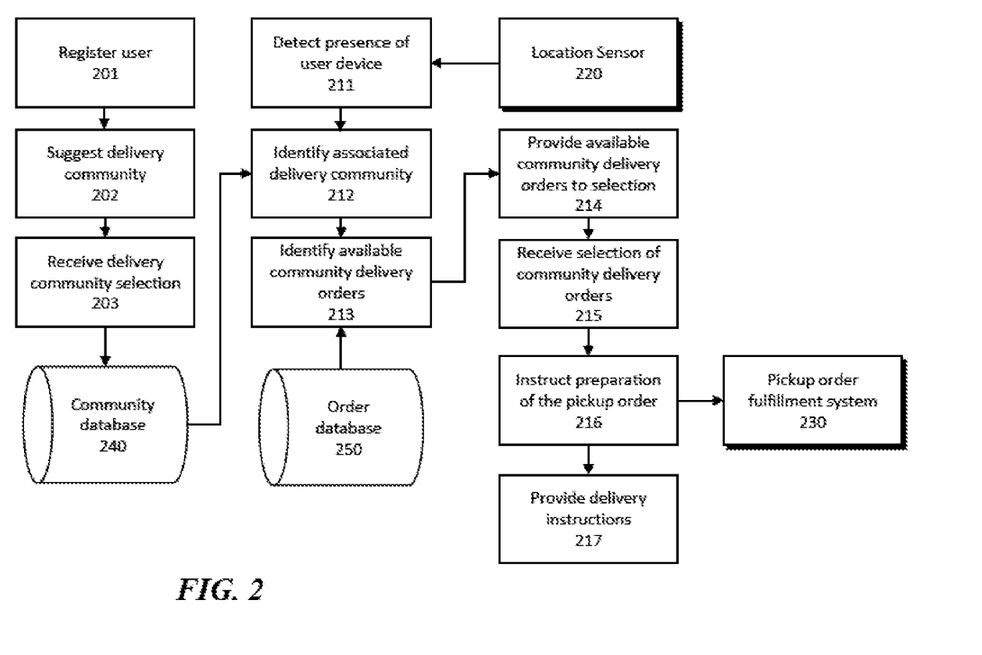
FIG. 2 comprises a flow diagram of a method in accordance with some embodiments.

FIG. 2 shows a flow diagram of a method for fulfilling pickup orders with community delivery in accordance with some embodiments of these teachings. The steps shown in FIG. 2 may be performed by one or more of the central computer system 110, the user device 130, the user device 131, the location sensor 121, and the pickup order fulfillment system 122 described with reference to FIG. 1 herein. In some embodiments, the steps are performed by one or more processor-based devices executing computer readable instructions stored on one or more memory devices.

In step 201, the system registers a user. In some embodiments, the user may opt-in to the community delivery program by registering for a community delivery program account. In some embodiments, a community delivery user interface may be provided as a graphical user interface (e.g. webpage, mobile application). In step 201, the user may select a username and password and provide one or more of real name, home address, work address, contact information, demographic information, default store location, and the like. In some embodiments, a store membership account (e.g. wholesale warehouse store membership, loyalty program account) may be used in step 201.

In step 202, the system suggests delivery communities to the user. In some embodiments, suggestions for the potential delivery communities are determined based on one or more of user home address, user work address, user demographic information, user inputted data, user select default store location, and user's current delivery community or communities. In some embodiments, the user interface may display delivery communities and community information such as members, requirements, status, associated store location, associated geographic region, etc. In some embodiments, some communities may opt-out of being recommended and may only be joined by an invite code or link. In such cases, the delivery community will not be selected as a suggested community. In some embodiments, a user may also start a new delivery community by naming the community and entering one or more settings for the community such as privacy settings (public vs. private), geographic region, associated store location, and other requirements.

In step 203, the system receives a selection of one or more delivery communities from the user. In some embodiments, for a private community, the system may notify the members and/or moderators of the selected community to obtain approval. After step 203, the system updates the community database 240 to associate the user with the one or more selected and/or approved delivery communities. In some embodiments, steps 202 and 203 may be repeated anytime when the user accesses the graphical user interface to add new communities. In some embodiments, the graphical user interface further allows users to remove community associations.

In step 211, the system detects the presence of a user device. In some embodiments, the presence of the user device of a store customer associated with a customer profile at a location associated with a store location is detected by a location sensor 220. In some embodiments, the location sensor 220 may comprise one or more of a wireless transceiver at a store location configured to detect transmission from user devices, a location sensor of the user device, or/or a network adapter configured to receive location information associated with the user device. In some embodiments, the location sensor may comprise a geolocation sensor of the user device, and the presence of the user device is detected based on the user device communicating the location of the user device to the control circuit. In some embodiments, a local wireless data transceiver (e.g. Wi-Fi or Bluetooth) at a store location may detect for transmissions from the user device to determine the presence of the user device. In some embodiments, the community delivery user interface application may first detect that the user device has arrived at a store via GPS signals and send a transmission to the store wireless data transceiver to confirm its presence. In some embodiments, a user device may confirm its presence by checking in at a store kiosk or sales terminal. For example, a user device may display a barcode to be scanned or use near field communication (NFC) signal to check in at a store location. In some embodiments, step 211 may be omitted, and the user may use the community delivery user interface to indicate that they have arrived at a store or are planning to visit a store at a select time. For example, the user may place a pickup order and select the desired pickup time. The system may then use the pickup time to select available community delivery orders that will be ready for pick up around the pickup time in step 213, prior to the customer arriving at the store. In another example, a user may sign in to their account at an in-store kiosk to view community delivery orders that are available to them at that store location.

In step 212, the system identifies the delivery community associated with the customer profile from a plurality of delivery communities in the community database 240. Generally, the system determines the delivery communities of which the user is a member. In some embodiments, two or more communities may be identified in step 212. In some embodiments, step 213, the system identifies available community delivery orders from among the orders in the order database 250. In some embodiments, available community delivery orders comprise orders associated with other members of the delivery community or communities identifies in step 212. In some embodiments, available community delivery orders may further be selected based on other criteria such as pickup location, pickup time, and order status (e.g. assigned, ready for pickup). For example, the system may only select pickup orders that are ready for pick up at the store location that the user device is currently at as detected in step 211.

In step 214, the system provides available community delivery orders for selection by the user. In some embodiments, the available community delivery orders may be displayed on the community delivery user interface. In some embodiments, steps 211-213 may be carried on the background and a user is notified via a text message, email message, mobile application notification, and the like when the system determines that there are community delivery orders available for the user to select/accept. In some embodiments, the delivery orders may be displayed with order information such as recipient name, recipient location, volume (e.g. one box, two boxes), weight, temperature requirement (e.g. refrigerated, frozen), and the like. In step 214, the system receives a selection of community delivery order(s). For example, a user may use their mobile device or an in-store kiosk to select one or more orders from the available community delivery orders displayed in step 214.

In some embodiments, after step 215, the user associated with the selected orders (e.g. order recipient) may be notified and the order proceeds to step 216 only after the recipient authorization is obtained for the order to be delivered via the community delivery. In some embodiments, when a customer places a pickup order, they may preauthorize the order for community delivery. In some embodiments, the preauthorization may apply to select communities of which the purchaser is a member. For example, a purchaser may specify that any member of their friend group delivery community may pick up their order for community delivery, but members of their apartment building delivery community require individual approval. In some embodiments, authorization requirements may be configured for each order when an order is placed. In some embodiments, authorization requirements may be configured as part of a customer's user profile and be applied to all orders placed by the customer by default.

In step 216, the system instructs the pickup order fulfillment system 230 to prepare the pickup order for pickup by the in-store customer. In some embodiments, in step 216 the order database 250 may be updated to add or replace the authorized pickup person associated with an order. In some embodiments, if the order is not yet ready for pickup, the system may instruct associates and/or automated machinery to aggregate the items in the order for pickup. In some embodiments, the pickup order fulfillment system 230 may further be instructed to use special packaging for community delivery orders. For example, while regular pickup orders may be placed in bags and totes, pickup orders being delivered through community delivery may be placed in sealed and/or tamper-proof containers (e.g. sealed cardboard box) to protect the privacy of the purchaser/recipient. In some embodiments, the containers may further be marked with delivery and handling instructions such as fragile, delivery time and/or date, delivery location, recipient name, recipient contact information, and the like. In some embodiments, the pickup order fulfillment system 230 may be instructed to aggregate orders selected in step 215 and orders placed by the customer into one location (e.g. shelf, tote) for pickup.

In step 217, the system provides delivery instructions to the customer. In some embodiments, delivery instructions comprise a delivery location for each order being delivered by the customer. In some embodiments, the delivery location for at least one of the one or more community delivery orders is determined based on one or more of customer location, customer profile, and customer configured preferences associated with the customer performing the delivery or the recipient of the delivery. In some embodiments, the delivery location may comprise a default meet up location associated with the delivery community identified in step 212. In some embodiments, the delivery location may be a location selected by the recipient of the order and displayed to the customer at 214. In some embodiments, the delivery instruction may comprise navigation instructions to the delivery location. In some embodiments, the delivery instruction may further comprise a delivery time or time frame. In some embodiments, the community delivery user interface may provide a messaging service to allow the customer performing the delivery and the recipient of the delivery to communicate via the user interface. In some embodiments, the community delivery user interface may allow users to share their real-time location with each other to meet up for delivery.

In some embodiments, after step 217, the system may further be configured to confirm receipt of the delivery. In some embodiments, the recipient and/or the deliverer may use the community delivery user interface to confirm the completion of the delivery. For example, the recipient may be asked to provide a receipt confirmation by selecting an option and/or scanning the delivery container using their mobile device. In another example, the customer preforming the delivery may be required to enter a confirmation code that the system provided to the recipient to confirm delivery. In some embodiments, the system may track the locations of user devices associated with the customer performing the delivery and the recipient to confirm the completion of delivery. In some embodiments, the system may credit an account associated with the customer that performed the delivery with an incentive at the completion of the community delivery order. In some embodiments, the incentive may comprise points towards status (e.g. gold, platinum) in the delivery community and/or store credit for future purchases.

In some embodiments, multiple instances of the steps shown in FIG. 2 may be carried out at the same time in a computer system to facilitate community delivery by a plurality of customers at a plurality of store locations.

Figure 3:
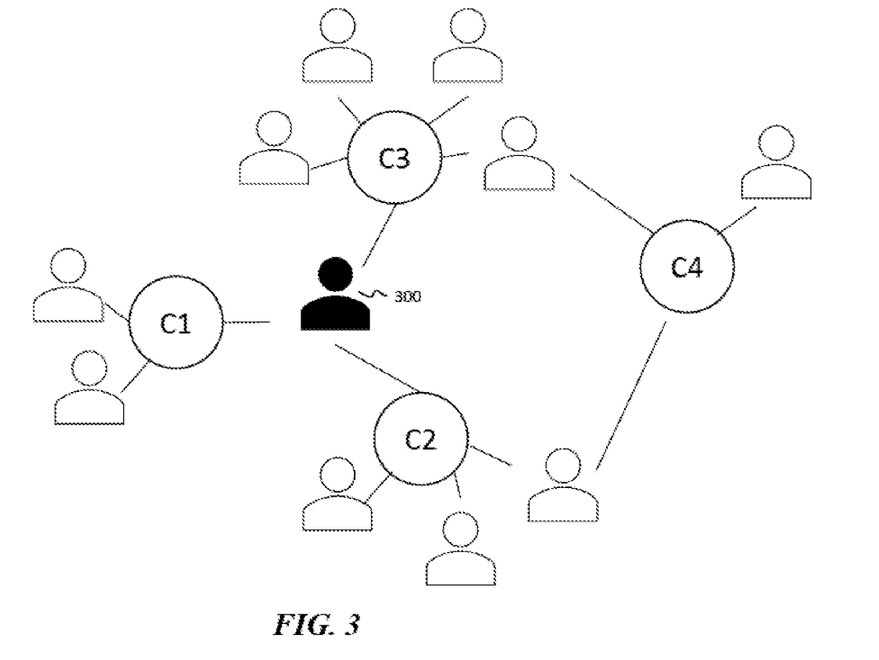
FIG. 3 comprises an illustration of communities in accordance with some embodiments.

FIG. 3 shows an illustration of delivery community associations. In FIG. 3, a customer 300 is shown to belong to delivery communities C1, C2, and C3. These communities may be associated with the user's office, gym, and apartment building, for example. Each of these communities includes other members. In some embodiments, each community may include at least one coordinator. Members of each community may also belong to one or more other communities. For example, a member of community C3 and a member community C2 are also members of community C4. When the customer 300 goes to a store, the system may retrieve pickup orders placed by members communities C1, C2, and C3 to determine orders that an available for community delivery by the customer 300. FIG. 3 is provided as an illustration only. Delivery communities may generally be of any size and a user may join any number of delivery communities.

In some embodiments, when a customer goes to pick up their order at a store location, they may also pick up orders that are available for other customers located in close proximity to their neighborhood. A customer may choose one of the orders to pick-up or may ask someone else to pick his/her order. In some embodiments, this feature may only be available to members with membership to the store location (e.g. wholesale club membership).

In some embodiments, systems and methods described herein allow store customers to become part of a crowdsourced neighborhood community order delivery program. A member may choose to be part of a neighborhood program and may begin with a starting credit. When a customer opens a shopping user interface (e.g. a mobile application) for club pickup, the user interface may display a list of other orders available for club pick-up belonging to members in the same neighborhood and at the same time slot. The customer may choose to pick up an order for someone else or allow someone else from their neighborhood to pick up their order. In some embodiments, a member that select to pick-up someone else's order may pick up the order from the store location, and the other member may be notified. In some embodiments, the customer that delivers the order may receive credits from the member whose order was delivered. In some embodiments, the process represents a "gamification" of orders as people can see how many credits they have earned and may be incentivized to work to earn additional credits. In some embodiments, members can be classified as Silver/Gold/Platinum, etc. based on their earned credits. In some embodiments, promotional sales initiatives may allow delivery credits to be converted to gift cards.

In some embodiments, a system for product delivery system comprises: a network adapter configured to communicate with a plurality of user devices over a network, a community database storing a plurality of user profiles and at least one delivery community associated with each of the plurality of user profiles, an order database storing a plurality of orders each associated with one of the plurality of user profiles, a pickup order fulfillment system, and a control circuit coupled to the network adapter, the community database, the order database, and the pickup order fulfillment system. The control circuit is configured to receive, via the network adapter and from a customer, a selection of a delivery community to join via a community delivery user interface, wherein the selection is stored in the community database, detect a presence of a user device of a store customer associated with a customer profile at a location associated with a store location based on a location sensor, identify the delivery community associated with the customer profile from a plurality of delivery communities in the community database, the delivery community comprises a plurality of members, identify available community delivery orders associated with other members of the delivery community in the order database, provide, via the community delivery user interface displayed on the user device, the available community delivery orders for selection by the store customer, receive, via the community delivery user interface, a selection of one or more community delivery orders available for delivery by the store customer, instruct the pickup order fulfillment system to prepare the one or more community delivery orders for pickup by the store customer, and provide, via the community delivery user interface, delivery instructions for the one or more community delivery orders.

In some embodiments, a method for product delivery comprises: receiving, via a network adapter and from a customer, a selection of a delivery community to join via a community delivery user interface, wherein the selection is stored in a community database storing a plurality of user profiles and at least one delivery community associated with each of the plurality of user profiles, detecting, at a control circuit, a presence of a user device of a store customer associated with a customer profile at a location associated with a store location based on a location sensor, identifying, with the control circuit, the delivery community associated with the customer profile from a plurality of delivery communities in the community database, the delivery community comprises a plurality of members, identifying, with the control circuit, available community delivery orders associated with other members of the delivery community in an order database storing a plurality of orders each associated with one of the plurality of user profiles, providing, with the control circuit and via the community delivery user interface displayed on the user device, the available community delivery orders for selection by the store customer, receiving, via the community delivery user interface, a selection of one or more community delivery orders available for delivery by the store customer, instructing, with the control circuit, a pickup order fulfillment system to prepare the one or more community delivery orders for pickup by the store customer, and providing, with the control circuit and via the community delivery user interface, delivery instructions for the one or more community delivery orders.

In some embodiments, an apparatus for product delivery comprises a non-transitory storage medium storing a set of computer readable instructions and a control circuit configured to execute the set of computer readable instructions which cause to the control circuit to: receive, via a network adapter and from a customer, a selection of a delivery community to join via a community delivery user interface, wherein the selection is stored in a community database storing a plurality of user profiles and at least one delivery community associated with each of the plurality of user profiles, detect, at the control circuit, a presence of a user device of a store customer associated with a customer profile at a location associated with a store location based on a location sensor, identify, with the control circuit, the delivery community associated with the customer profile from a plurality of delivery communities in the community database, the delivery community comprises a plurality of members, identify, with the control circuit, available community delivery orders associated with other members of the delivery community in an order database storing a plurality of orders each associated with one of the plurality of user profiles, provide, with the control circuit and via the community delivery user interface displayed on the user device, the available community delivery orders for selection by the store customer, receive, via the community delivery user interface, a selection of one or more community delivery orders available for delivery by the store customer, instruct, with the control circuit, a pickup order fulfillment system to prepare the one or more community delivery orders for pickup by the store customer, and provide, with the control circuit and via the community delivery user interface, delivery instructions for the one or more community delivery orders.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system for product delivery, the system comprises:
a network adapter configured to communicate with a plurality of user devices over a network;
a community database storing a plurality of user profiles and at least one delivery community associated with each of the plurality of user profiles;
an order database storing a plurality of orders each associated with one of the plurality of user profiles;
a pickup order fulfillment system; and
a control circuit coupled to the network adapter, the community database, the order database, and the pickup order fulfillment system, the control circuit being configured to:
receive, via the network adapter and from a customer, a selection of a delivery community to join via a community delivery user interface, wherein the selection is stored in the community database;

detect a presence of a user device of a store customer associated with a customer profile at a location associated with a store location based on a location sensor;

identify the delivery community associated with the customer profile of the store customer from a plurality of delivery communities in the community database, the store customer having selected to become a member of the delivery community according to the community database and the delivery community comprises a plurality of members;

identify available community delivery orders associated with other members of the delivery community of the store customer in the order database;

provide, via the community delivery user interface displayed on the user device, the available community delivery orders for selection by the store customer;

receive, via the community delivery user interface, a selection of one or more community delivery orders among the available community delivery orders for delivery by the store customer;

instruct the pickup order fulfillment system to prepare the one or more community delivery orders for pickup by the store customer; and provide, via the community delivery user interface displayed on the user device of the store customer, delivery instructions for the one or more community delivery orders.

2. The system of claim 1, wherein the control circuit is further configured to:

provide, via the community delivery user interface, suggestions for potential delivery communities to join.

3. The system of claim 2, wherein the suggestions for the potential delivery communities are determined based on one or more of user home address, user work address, user demographic information, user inputted data, and user's current delivery community.

4. The system of claim 1, wherein the delivery community comprises at least one coordinator authorized to add and remove members to the delivery community.

5. The system of claim 1, wherein the control circuit is further configured to:

obtain authorization from a customer associated with an available community delivery order prior to instructing the pickup order fulfillment system to prepare the available community delivery order for pickup by the store customer.

6. The system of claim 1, wherein the control circuit is further configured to determine a delivery location for at least one of the one or more community delivery orders based on one or more of: customer location, customer profile, and customer configured preferences.

7. The system of claim 1, wherein the control circuit is further configured to:

receive, from a second user device associated with a recipient of a community delivery order, a receipt confirmation for the community delivery order to complete the community delivery order.

8. The system of claim 1, wherein the control circuit is further configured to credit an account associated with the store customer with an incentive at a completion of a community delivery order.

9. The system of claim 1, wherein the location sensor comprises a geolocation sensor of the user device, and the presence of the user device is detected based on the user device communicating the location of the user device to the control circuit.

10. The system of claim 1, wherein the location sensor comprises a transceiver at the store location configured to wirelessly communicate with the user device.

11. A method for product delivery comprising:

receiving, via a network adapter and from a store customer, a selection of a delivery community to join via a community delivery user interface, wherein the selection is stored in a community database storing a plurality of user profiles and at least one delivery community associated with each of the plurality of user profiles;

detecting, at a control circuit, a presence of a user device of a store customer associated with a customer profile at a location associated with a store location based on a location sensor;

identifying, with the control circuit, the delivery community associated with the customer profile of the store customer from a plurality of delivery communities in the community database, the store customer having selected to become a member of the delivery community according to the community database and the delivery community comprises a plurality of members;

identifying, with the control circuit, available community delivery orders associated with other members of the delivery community of the store customer in an order database storing a plurality of orders each associated with one of the plurality of user profiles;

providing, with the control circuit and via the community delivery user interface displayed on the user device, the available community delivery orders for selection by the store customer;

receiving, via the community delivery user interface, a selection of one or more community delivery orders among the available community delivery orders for delivery by the store customer;

instructing, with the control circuit, a pickup order fulfillment system to prepare the one or more community delivery orders for pickup by the store customer; and providing, with the control circuit and via the community delivery user interface displayed on the user device of the store customer, delivery instructions for the one or more community delivery orders.

12. The method of claim 11, wherein the control circuit is further configured to:

provide, via the community delivery user interface, suggestions for potential delivery communities to join.

13. The method of claim 12, wherein the suggestions for the potential delivery communities are determined based on one or more of user home address, user work address, user demographic information, user inputted data, and user's current delivery community.

14. The method of claim 11, wherein the delivery community comprises at least one coordinator authorized to add and remove members to the delivery community.

15. The method of claim 11, wherein the control circuit is further configured to:

obtain authorization from a customer associated with an available community delivery order prior to instructing the pickup order fulfillment system to prepare the available community delivery order for pickup by the store customer.

16. The method of claim 11, wherein the control circuit is further configured to determine a delivery location for at least one of the one or more community delivery orders based on one or more of: customer location, customer profile, and customer configured preferences.

17. The method of claim 11, wherein the control circuit is further configured to credit an account associated with the store customer with an incentive at a completion of a community delivery order.

18. The method of claim 11, wherein the location sensor comprises a geolocation sensor of the user device, and the presence of the user device is detected based on the user device communicating the location of the user device to the control circuit.

19. The method of claim 11, wherein the location sensor comprises a transceiver at the store location configured to wirelessly communicate with the user device.

20. An apparatus for product delivery comprising:
   a non-transitory storage medium storing a set of computer readable instructions; and
   a control circuit configured to execute the set of computer readable instructions which cause to the control circuit to:
      receive, via a network adapter and from a customer, a selection of a delivery community to join via a community delivery user interface, wherein the selection is stored in a community database storing a plurality of user profiles and at least one delivery community associated with each of the plurality of user profiles;
      detect, at the control circuit, a presence of a user device of a store customer associated with a customer profile at a location associated with a store location based on a location sensor;
      identify, with the control circuit, the delivery community associated with the customer profile of the store customer from a plurality of delivery communities in the community database, the store customer having selected to become a member of the delivery community according to the community database and the delivery community comprises a plurality of members;
      identify, with the control circuit, available community delivery orders associated with other members of the delivery community of the store customer in an order database storing a plurality of orders each associated with one of the plurality of user profiles;
      provide, with the control circuit and via the community delivery user interface displayed on the user device, the available community delivery orders for selection by the store customer;
      receive, via the community delivery user interface, a selection of one or more community delivery orders among the available community delivery orders for delivery by the store customer;
      instruct, with the control circuit, a pickup order fulfillment system to prepare the one or more community delivery orders for pickup by the store customer; and
      provide, with the control circuit and via the community delivery user interface displayed on the user device of the store customer, delivery instructions for the one or more community delivery orders.

* * * * *